(12) United States Patent
Wen (10) Patent No.: US 10,863,595 B2
(45) Date of Patent: Dec. 8, 2020

(54) ANALOG FILAMENT IMPEDANCE CIRCUIT, LED LAMP TUBE AND LED LIGHTING SYSTEM

(71) Applicant: OPPLE LIGHTING CO., LTD., Shanghai (CN)

(72) Inventor: Wei Wen, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 16/266,013

(22) Filed: Feb. 2, 2019

(65) Prior Publication Data
US 2019/0174588 A1    Jun. 6, 2019

Related U.S. Application Data

(63) Continuation of application No. PCT/CN2017/095672, filed on Aug. 2, 2017.

(30) Foreign Application Priority Data

Aug. 3, 2016 (CN) .......................... 2016 1 0630221
Aug. 3, 2016 (CN) .......................... 2016 2 0835534

(51) Int. Cl.
   *H05B 45/00*    (2020.01)
   *F21K 9/278*    (2016.01)
   (Continued)

(52) U.S. Cl.
   CPC ............. *H05B 45/00* (2020.01); *F21K 9/278* (2016.08); *F21V 23/003* (2013.01); *H05B 45/37* (2020.01)

(58) Field of Classification Search
   CPC ................................ F21K 9/278; F21V 23/003
   See application file for complete search history.

(56) References Cited

U.S. PATENT DOCUMENTS 9,137,866 B2    9/2015    McBryde
9,439,249 B2    9/2016    Zhang
(Continued)

FOREIGN PATENT DOCUMENTS

CN    102155631 A    8/2011
CN    104595762 A    5/2015
(Continued)

OTHER PUBLICATIONS

International Search Report (including English translation) and Written Opinion issued in PCT/CN2017/095672, dated Sep. 28, 2017, 12 pages.

*Primary Examiner* — Henry Luong
(74) *Attorney, Agent, or Firm* — Arch & Lake LLP (57) ABSTRACT

The present disclosure provides an analog filament impedance circuit, an LED lamp tube and an LED lighting system, the analog filament impedance circuit having a pole frequency and a zero frequency, where: the pole frequency is less than the zero frequency; an equivalent impedance value of the analog filament impedance circuit remains unchanged when an input frequency is less than the pole frequency, and is a first equivalent impedance value; an equivalent impedance value of the analog filament impedance circuit decreases as the input frequency increases when the input frequency is greater than the pole frequency and less than the zero frequency; an equivalent impedance value of the analog filament impedance circuit remains unchanged when the input frequency is greater than the zero frequency, and is a second equivalent impedance value; and the first equivalent impedance value is greater than the second equivalent impedance value.

9 Claims, 4 Drawing Sheets

(51) Int. Cl.
*H05B 45/37* (2020.01)
*F21V 23/00* (2015.01)

(56) References Cited

U.S. PATENT DOCUMENTS

| | | | |
|---|---|---|---|
| 2014/0132164 A1 | 5/2014 | McBryde | |
| 2014/0203714 A1 | 7/2014 | Zhang | |
| 2014/0203717 A1* | 7/2014 | Zhang | H05B 45/37 315/188 |
| 2014/0204571 A1 | 7/2014 | Zhang | |
| 2014/0225520 A1 | 8/2014 | Zhang | |

FOREIGN PATENT DOCUMENTS

| | | |
|---|---|---|
| CN | 104696732 A | 6/2015 |
| CN | 104956767 A | 9/2015 |
| CN | 106102255 A | 11/2016 |
| CN | 205987460 U | 2/2017 |
| JP | 2009245790 A | 10/2009 |

\* cited by examiner

ANALOG FILAMENT IMPEDANCE CIRCUIT, LED LAMP TUBE AND LED LIGHTING SYSTEM

CROSS-REFERENCE TO RELATED APPLICATIONS

This application is based upon and claims the priority of PCT patent application No. PCT/CN2017/095672 filed on Aug. 2, 2017 which claims the priority of Chinese Patent Application No. 201610630221.6 filed on Aug. 3, 2016 and Chinese Patent Application No. 201620835534.0 filed on Aug. 3, 2016, the entire content of all of which is hereby incorporated by reference herein for all purposes.

TECHNICAL FIELD

The present disclosure relates to a lighting field, and more particularly, to an analog filament impedance circuit, an LED lamp tube and an LED lighting system.

BACKGROUND

A Light Emitting Diode (LED) light source has been attached much attention and widely applied due to its small size, high brightness, low power consumption, long service life, as well as other advantages, so that it has gradually become a trend to replace a fluorescent lamp tube with an LED lamp tube.

SUMMARY

The present disclosure provides an analog filament impedance circuit, an LED lamp tube and a method of utilizing an analog filament impedance circuit.

Based on one aspect of the disclosure, an analog filament impedance circuit is provided. The analog filament impedance circuit may have a pole frequency and a zero frequency, where the pole frequency is less than the zero frequency; an equivalent impedance value of the analog filament impedance circuit remains unchanged when an input frequency is less than the pole frequency, and is a first equivalent impedance value; an equivalent impedance value of the analog filament impedance circuit decreases as the input frequency increases when the input frequency is greater than the pole frequency and less than the zero frequency; an equivalent impedance value of the analog filament impedance circuit remains unchanged when the input frequency is greater than the zero frequency, and is a second equivalent impedance value; and the first equivalent impedance value is greater than the second equivalent impedance value.

Based on another aspect of the disclosure, an LED lamp tube is provided, which may include: at least one analog filament impedance circuit, an LED driving module; and at least one LED light emitting element, where the LED driving module is coupled with the analog filament impedance circuit, and the at least one light emitting element is coupled with the LED driving module.

The at least one analog filament impedance circuit included in the LED lamp tube may include a pole frequency and a zero frequency, and where the pole frequency is less than the zero frequency; an equivalent impedance value of the analog filament impedance circuit remains unchanged when an input frequency is less than the pole frequency, and is a first equivalent impedance value; an equivalent impedance value of the analog filament impedance circuit decreases as the input frequency increases when the input frequency is greater than the pole frequency and less than the zero frequency; an equivalent impedance value of the analog filament impedance circuit remains unchanged when the input frequency is greater than the zero frequency, and is a second equivalent impedance value; and the first equivalent impedance value is greater than the second equivalent impedance value.

Based on a third aspect of the disclosure, a method of utilizing an analog filament impedance circuit is provided. The method may include: obtaining a pole frequency that is less than a zero frequency; keeping an equivalent impedance value of the analog filament impedance circuit remains unchanged when an input frequency is less than the pole frequency, and is a first equivalent impedance value; decreasing an equivalent impedance value of the analog filament impedance circuit as the input frequency increases when the input frequency is greater than the pole frequency and less than the zero frequency; keeping an equivalent impedance value of the analog filament impedance circuit remains unchanged when the input frequency is greater than the zero frequency, and is a second equivalent impedance value; and obtaining the first equivalent impedance value that is greater than the second equivalent impedance value.

It is to be understood that both the foregoing general description and the following detailed description are exemplary and explanatory only and are not restrictive of the present disclosure.

BRIEF DESCRIPTION OF THE DRAWINGS

Those ordinarily skill in the art will clearly understand various other advantages and benefits, through reading the detailed description of preferred implementation modes hereinafter. The accompanying drawings are provided only for illustrating the preferred implementation modes, rather than limiting the present disclosure. Throughout the accompanying drawings, the same reference signs usually denote the same components. In the drawings.

DETAILED DESCRIPTION

Hereinafter, examples of the present disclosure will be described in more detail with reference to the accompanying drawings. Although the examples of the present disclosure are shown in the drawings, it should be understood that the present disclosure may be implemented in various forms and should not be limited by the examples explained here.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

The fluorescent lamp cannot be directly connected with a mains electricity supply for working, so a ballast needs to be added between the mains electricity supply and the fluorescent lamp. According to different working frequencies, the ballast mainly includes two types: an inductive ballast and an electronic ballast, of which the inductive ballast outputs a low frequency voltage and a low frequency current, generally at 50/60 Hz, and the electronic ballast outputs a high frequency voltage and a high frequency current, generally at above 20 kHz. Sometimes, when the LED lamp tube is used to substitute the fluorescent lamp, it is mainly to directly replace the original fluorescent lamp, without changing internal wiring of the lamp, which, however, requires the installed LED lamp tube to be compatible with the original ballast.

Figure 1:
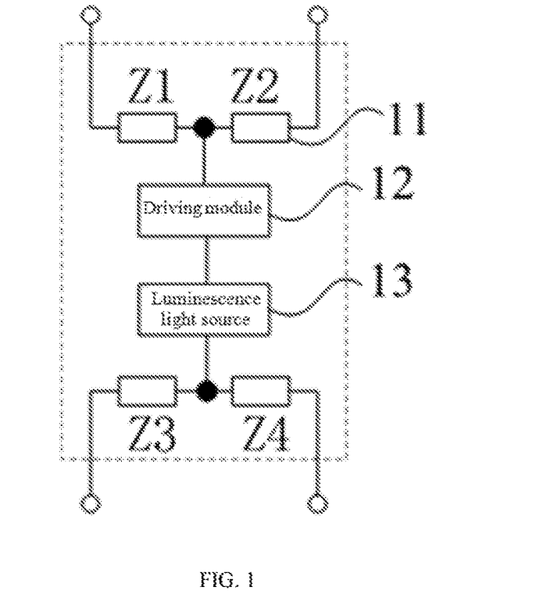
FIG. 1 illustrates a structural schematic diagram of an LED lamp tube.

FIG. 1 illustrates a structural schematic diagram of an LED lamp tube. With reference to FIG. 1, the LED lamp tube comprises an analog filament impedance circuit 11, a driving module 12 and a luminescence light source 13. The analog filament impedance circuit 11 is composed of four impedance modules (i.e., Z1, Z2, Z3 and Z4), Z1 and Z2 are connected in series, and Z3 and Z4 are connected in series. One end of the driving module 12 is connected with Z1 and Z2, the other end of the driving module 12 is connected with the luminescence light source 13, and one end of the luminescence light source 13 is connected with Z3 and Z4.

Existence of the analog filament impedance circuit in the LED lamp tube is necessary; the circuit may not be open, and there is an external ballast of the LED lamp tube detecting impedance of the analog filament impedance circuit to determine whether the lamp tube is connected, and determine whether the ballast works according to a detection result; and the circuit may not be short-circuited or applied with too small impedance, otherwise, overload of a portion of the ballast through a filament heating a winding will be incurred, which may further cause failure of the ballast.

In addition, the International Electro technical Commission (IEC) standard has a requirement on a minimal value for the analog filament impedance circuit; a test method is to add a 50/60 Hz low-voltage signal across the filament, to detect a current flowing through the analog filament impedance circuit, wherein, the current value must be less than a value specified in the IEC standard. Specifically, a voltage of 3.6V is applied to both ends of Z1 and Z2, or Z3 and Z4, and a current passing through Z1 and Z2, or Z3 and Z4 may not exceed 0.51 A. At the same time, an impedance value of the analog filament impedance circuit should not be too large; since a current flowing into the LED lamp tube is bound to flow through the analog filament impedance circuit, excessive impedance of the analog filament impedance circuit will increase power consumption of the lamp tube and influence a photoelectric transformation efficiency of the lamp tube.

Sometimes, an impedance unit of the analog filament impedance circuit may be simulated in two modes below.

Figure 2A:
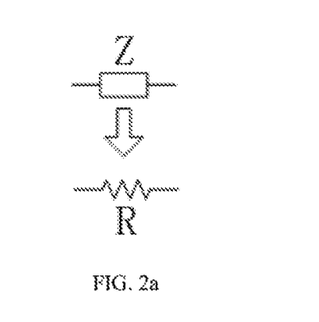
FIG. 2a illustrates a structural schematic diagram of an analog filament impedance circuit.

A first mode: with reference to FIG. 2a, a resistance element is used directly to simulate a filament resistance of the fluorescent lamp, and a required resistance value is calculated by measuring a cold resistance and a hot resistance of the filament in the fluorescent lamp.

Figure 2B:
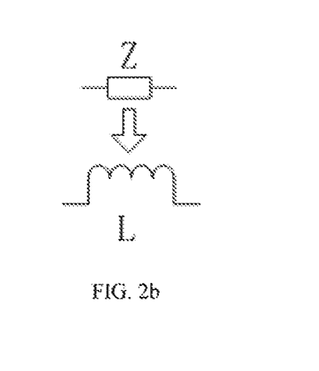
FIG. 2b illustrates another structural schematic diagram of the analog filament impedance circuit.

A second mode: with reference to FIG. 2b, the filament resistance of the fluorescent lamp is simulated with an inductive element, so that the filament impedance of the fluorescent lamp is equivalent to inductive reactance of the inductive element at a high frequency.

The analog filament impedance circuit formed in the first mode has no pole frequency or zero frequency, that is, the impedance value of the analog filament impedance circuit does not change as the frequency changes; the analog filament impedance circuit formed in the second mode has only one zero frequency, the impedance value of the analog filament impedance circuit increases as the frequency increases, and the analog filament impedance circuit is approximately short-circuited at a low frequency of 50/60 Hz.

Therefore, an analog filament impedance circuit has not been provided yet to fulfill the IEC standard test without affecting the transformation efficiency of the lamp tube.

In order to solve the above-described technical problems, the present disclosure provides an analog filament impedance circuit. The analog filament impedance circuit has a pole frequency and a zero frequency, wherein, the pole frequency is less than the zero frequency; an equivalent impedance value of the analog filament impedance circuit remains unchanged when an input frequency is less than the pole frequency, and is a first equivalent impedance value; an equivalent impedance value of the analog filament impedance circuit decreases as the input frequency increases when the input frequency is greater than the pole frequency and less than the zero frequency; an equivalent impedance value of the analog filament impedance circuit remains unchanged when the input frequency is greater than the zero frequency, and is a second equivalent impedance value; and the first equivalent impedance value is greater than the second equivalent impedance value.

Figure 3:
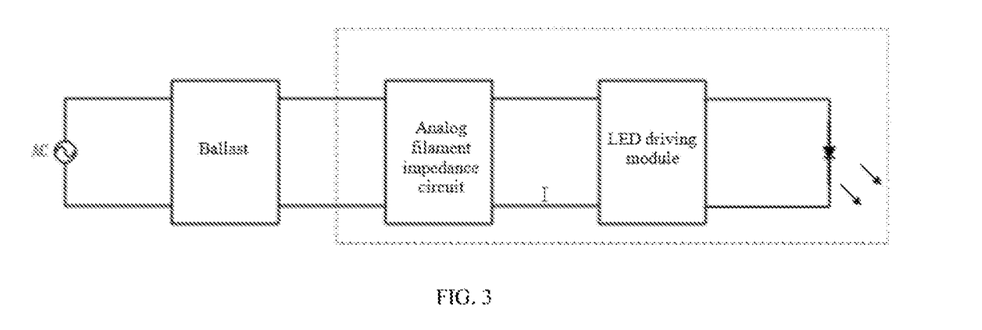
FIG. 3 is a schematic diagram showing an application of an analog filament impedance circuit according to an example of the present disclosure.

FIG. 3 is a schematic diagram illustrating an application of the analog filament impedance circuit according to the example of the present disclosure. With reference to FIG. 3, the analog filament impedance circuit provided by the example of the present disclosure is set in the LED lamp tube, one end of the analog filament impedance circuit is connected with an external ballast of the LED lamp tube, and the other end is connected with an LED driving module within the LED lamp tube.

The analog filament impedance circuit provided by the present disclosure has the pole frequency and the zero frequency at the same time, and the pole frequency is less than the zero frequency. The equivalent impedance value of the analog filament impedance circuit exhibits a corresponding change trend along with the input frequency, that is, the first equivalent impedance value of the analog filament impedance circuit, when the input frequency is less than the pole frequency, is greater than the second equivalent impedance value of the analog filament impedance circuit, when the input frequency is greater than the zero frequency; and the equivalent impedance value of the analog filament impedance circuit decreases as the input frequency increases, when the input frequency is greater than the pole frequency and less than the zero frequency. Thus, it is concluded that: the equivalent impedance value of the analog filament impedance circuit is relatively high when the input frequency is less than the pole frequency; and the equivalent impedance value of the analog filament impedance circuit is relatively low when the input frequency is greater than the zero frequency.

When the analog filament impedance circuit undergoes the IEC standard test, since the frequency of the test is relatively low, which is generally 50/60 Hz, the frequency of the IEC standard test is less than the pole frequency of the analog filament impedance circuit, and the equivalent impedance value of the analog filament impedance circuit is relatively large when the input frequency is the frequency of the IEC standard test, so that the equivalent impedance value of the analog filament impedance circuit may meet a requirement of the IEC standard test on a minimal value. If the external ballast of the analog filament impedance circuit provided by the present disclosure is an inductive ballast, a voltage and a current input from the inductive ballast to the analog filament impedance circuit are a low frequency voltage and a low frequency current, in a high-voltage small-current state, at which time, relatively large equivalent impedance value of the analog filament impedance circuit does not have much influence on transformation efficiency of the LED lamp tube. If the external ballast of the analog filament impedance circuit provided by the present disclosure is an electronic ballast, an output frequency of the electronic ballast is relatively high, and the output frequency is greater than the pole frequency of the analog filament impedance circuit, and even greater than the zero frequency of the analog filament impedance circuit. Since the equivalent impedance value of the analog filament impedance circuit decreases as the input frequency increases when the input frequency is greater than the pole frequency, the analog filament impedance circuit has a relatively small equivalent impedance value at this time, and the electronic ballast inputs a low voltage and a large current to the analog filament impedance circuit. At this time, the relatively small equivalent impedance value of the analog filament impedance circuit may significantly reduce its own power consumption, so as to further reduce influence on the transformation efficiency of the lamp tube.

In an example of the present disclosure, the analog filament impedance circuit at least includes a first resistor, a second resistor and a first capacitor.

Figure 4:
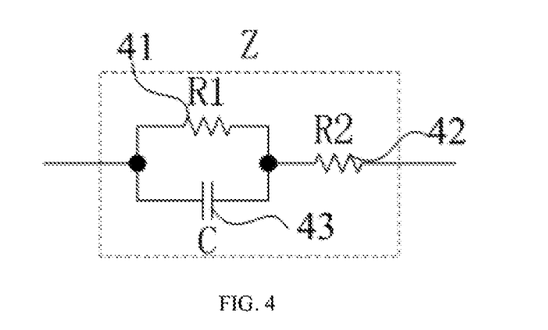
FIG. 4 illustrates a structural schematic diagram of an analog filament impedance circuit according to an example of the present disclosure.

FIG. 4 illustrates a structural schematic diagram of an analog filament impedance circuit according to an example of the present disclosure. With reference to FIG. 4, the analog filament impedance circuit comprises a first resistor 41, a second resistor 42 and a first capacitor 43, wherein, the first resistor 41 and the first capacitor 43 are connected in parallel, and then connected in series with the second resistor 42.

An expression of an equivalent impedance value Z of the analog filament impedance circuit illustrated in FIG. 4 is:

$$Z = \frac{R1 \times \frac{1}{jwc}}{R1 + \frac{1}{jwc}} + R2,$$

where, R1 is a resistance value of the first resistor 41, R2 is a resistance value of the second resistor 42, C is a capacitance value of the first capacitor 43, and w is an angular frequency.

Since an angular frequency $w = 2\pi f$, where, f is a frequency, an expression of equivalent impedance value Z is:

$$Z = (R1 + R2) \times \frac{1 + j2\pi f \frac{R1 \times R2}{R1 + R2} C}{1 + j2\pi f R1 C}.$$

It may be known from the expression of the equivalent impedance value Z of the analog filament impedance circuit that the analog filament impedance circuit has a pole frequency and a zero frequency. That is, when $1+j2\pi fR1C=0$, the equivalent impedance value Z of the analog filament impedance circuit is maximal; when $1+j2\pi fR1R2/(R1+R2)*C=0$, the equivalent impedance value of the analog filament impedance circuit is minimal; and therefore, a pole frequency $f_p$ of the analog filament impedance circuit is:

$$f_p = \frac{1}{2\pi R1 C},$$

A zero frequency $f_z$ of the analog filament impedance circuit is:

$$f_z = \frac{1}{2\pi \frac{R1 \times R2}{R1 + R2} C}.$$

Because $$R1 > \frac{R1 \times R2}{R1 + R2},$$

the pole frequency $f_p$<the zero frequency $f_z$.

When an input frequency is less than pole frequency $f_p$, the input frequency is in a low frequency state, and it may be known from a circuit principle that the first capacitor 43 is equivalent to an open circuit, at which time, the analog filament impedance circuit is equivalent to a series connection of the first resistor 41 and the second resistor 42, and the equivalent impedance value of the analog filament impedance circuit: Z=R1+R2. When the input frequency is greater than zero frequency $f_z$, it may be known from the circuit principle that the first resistor 41 is short-circuited by the first capacitor 43, at which time, the equivalent impedance value of the analog filament impedance circuit: Z=R2. Thus, it is concluded that the equivalent impedance value, when the input frequency is less than the pole frequency, is greater than the equivalent impedance value, when the input frequency is greater than the zero frequency.

When the analog filament impedance circuit works at a low frequency of 50/60 Hz, since the frequency is less than pole frequency $f_p$, the equivalent impedance value of the analog filament impedance circuit at this time is relatively large, which may meet the requirement of the IEC standard test on the minimal value; when the external ballast of the analog filament impedance circuit is an electronic ballast, since an output frequency of the electronic ballast is much higher than pole frequency $f_p$, and approximate to or even exceeds zero frequency $f_z$, at this time, the equivalent impedance value of the analog filament impedance circuit is relatively small, and the relatively small equivalent impedance value of the analog filament impedance circuit may significantly reduce its own power consumption, so as to further reduce influence on the transformation efficiency of the lamp tube.

Figure 5:
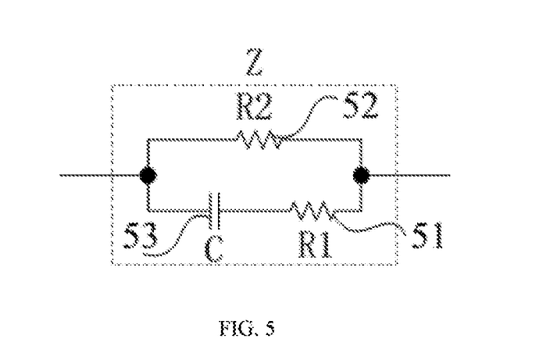
FIG. 5 illustrates another structural schematic diagram of an analog filament impedance circuit according to an example of the present disclosure.

FIG. 5 illustrates a structural schematic diagram of an analog filament impedance circuit according to an example of the present disclosure. With reference to FIG. 5, the analog filament impedance circuit comprises a first resistor 51, a second resistor 52 and a first capacitor 53, wherein, the first resistor 51 and the first capacitor 53 are connected in series, and then connected in parallel with the second resistor 52.

An expression of an equivalent impedance value Z of the analog filament impedance circuit illustrated in FIG. 5 is:

$$Z = \frac{\left(R1 + \frac{1}{jwC}\right) \times R2}{R1 + \frac{1}{jwC} + R2},$$

where, R1 is a resistance value of the first resistor 51, R2 is a resistance value of the second resistor 52, C is a capacitance value of the first capacitor 53, and w is an angular frequency.

Since an angular frequency $w=2\pi f$, where, f is a frequency, an expression of equivalent impedance value Z is:

$$Z = R2 \times \frac{1 + j2\pi fR1C}{1 + j2\pi f(R1+R2)C}.$$

It may be known from the expression of the equivalent impedance value Z of the analog filament impedance circuit that the analog filament impedance circuit has a pole frequency and a zero frequency. That is, when $1+j2\pi f(R1+R2)C=0$, the equivalent impedance value Z of the analog filament impedance circuit is maximal; when $1+j2\pi fR1C=0$, the equivalent impedance value of the analog filament impedance circuit is minimal; and therefore, a pole frequency $f_p$ of the analog filament impedance circuit is:

$$f_p = \frac{1}{2\pi(R1+R2)C}.$$

A zero frequency $f_z$ of the analog filament impedance circuit is:

$$f_z = \frac{1}{2\pi R1C}.$$

Since (R1+R2)>R1, the pole frequency $f_p$<the zero frequency $f_z$.

When the input frequency is less than the pole frequency $f_p$, the input frequency is in a low frequency state, and it may be known from a circuit principle that the first capacitor 53 is equivalent to an open circuit, at which time, the analog filament impedance circuit is equivalent to a circuit where only the second resistor 52 works, and the equivalent impedance value of the analog filament impedance circuit: Z=R2. When the input frequency is greater than the zero frequency $f_z$, it may be known from the circuit principle that the analog filament impedance circuit is equivalent to a parallel connection of the first resistor 51 and the second resistor 52, at which time, the equivalent impedance value of the analog filament impedance circuit: Z=R1R2/(R1+R2). Thus, it is concluded that the equivalent impedance value, when the input frequency is less than the pole frequency, is greater than the equivalent impedance value, when the input frequency is greater than the zero frequency.

When the analog filament impedance circuit works at a low frequency of 50/60 Hz, since the frequency is less than the pole frequency $f_p$, the equivalent impedance value of the analog filament impedance circuit at this time is relatively large, which may meet a requirement of the IEC standard test on a minimal value; when the external ballast of the analog filament impedance circuit is an electronic ballast, since an output frequency of the electronic ballast is relatively high, and much higher than the pole frequency $f_p$, and approximate to or even exceeds the zero frequency $f_z$, at this time, the equivalent impedance value of the analog filament impedance circuit is relatively small, and the relatively small equivalent impedance value of the analog filament impedance circuit may significantly reduce its own power consumption, so as to further reduce influence on transformation efficiency of the lamp tube.

Figure 6:
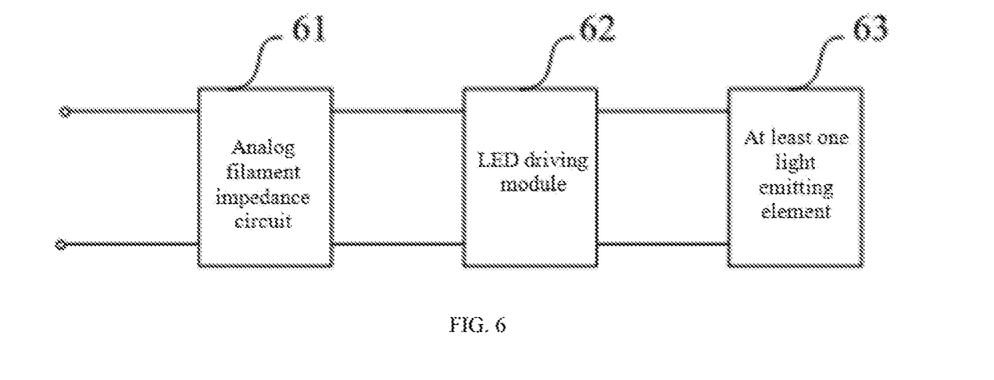
FIG. 6 illustrates a structural schematic diagram of an LED lamp tube according to an example of the present disclosure.

Based on the same inventive concept, the present disclosure further provides an LED lamp tube. FIG. 6 illustrates a structural schematic diagram of an LED lamp tube according to an example of the present disclosure. With reference to FIG. 6, the LED lamp tube comprises: at least one analog filament impedance circuit 61 illustrated in either example disclosed above, an LED driving module 62 and at least one LED light emitting element 63, wherein, the LED driving module 62 is coupled with the analog filament impedance circuit 61, and the at least one light emitting element 63 is coupled with the LED driving module 62.

Figure 7:
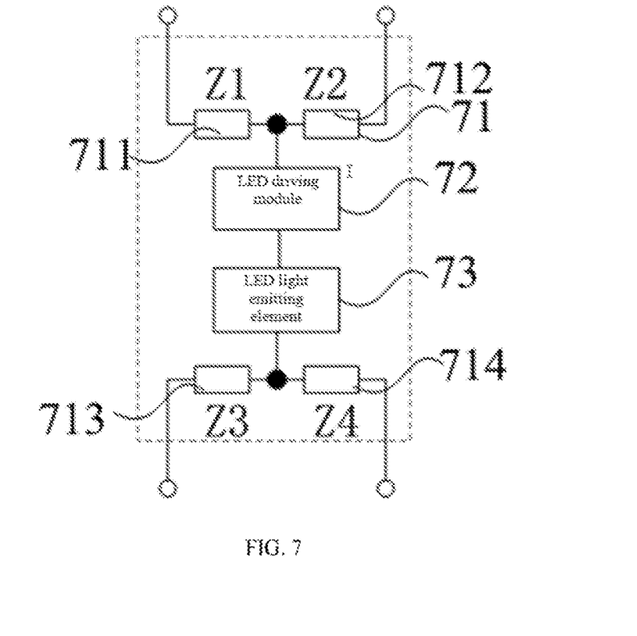
FIG. 7 is a schematic diagram showing a circuit of the LED lamp tube according to the example of the present disclosure.

Particularly, FIG. 7 illustrates a circuit schematic diagram of the LED lamp tube according to the example of the present disclosure. With reference to FIG. 7, the LED lamp tube comprises four analog filament impedance circuits 71 illustrated in either example disclosed above, the four analog filament impedance circuits 71 being respectively a first analog filament impedance circuit 711, a second analog filament impedance circuit 712, a third analog filament impedance circuit 713 and a fourth analog filament impedance circuit 714. The first analog filament impedance circuit 711 and the second analog filament impedance circuit 712 are connected in series, and the third analog filament impedance circuit 713 and the fourth analog filament impedance circuit 714 are connected in series. One end of an LED driving module 72 is connected with one end of the first analog filament impedance circuit 711 and one end of the second analog filament impedance circuit 712, the other end of the LED driving module 72 is connected with at least one LED light emitting element 73, and the other end of the at least one LED light emitting element 73 is connected with one end of the third analog filament impedance circuit 713 and one end of the fourth analog filament impedance circuit 714.

If an external ballast of the LED lamp tube provided by the example of the present disclosure is an inductive ballast, one end of the first analog filament impedance circuit 711 not connected with the LED driving module 72 is connected with the external inductive ballast of the LED lamp tube, one end of the second analog filament impedance circuit 712 not connected with the LED driving module 72 is connected with one end of an external glow starter of the LED lamp tube, one end of the third analog filament impedance circuit 713 not connected with the at least one LED light emitting element 73 is connected with a neutral wire in connection with the mains electricity supply, and one end the fourth analog filament impedance circuit 714 not connected with the at least one LED light emitting element 73 is connected with the other end of the glow starter.

If the external ballast of the LED lamp tube provided by the example of the present disclosure is an electronic ballast, one end of the first analog filament impedance circuit 711 not connected with the LED driving module 72, one end of the second analog filament impedance circuit 712 not connected with the LED driving module 72, one end of the third analog filament impedance circuit 713 not connected with the at least one LED light emitting element 73 and one end of the fourth analog filament impedance circuit 714 not connected with the at least one LED light emitting element 73 are all connected with the electronic ballast.

Figure 8:
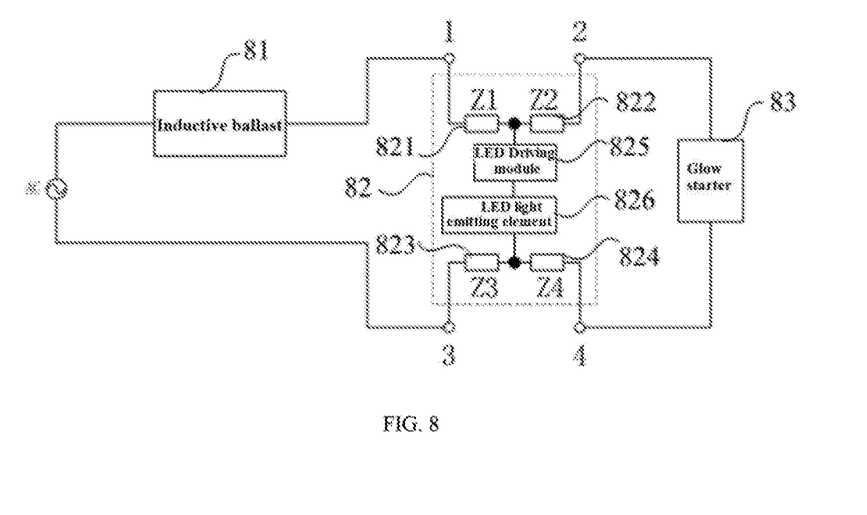
FIG. 8 illustrates a structural schematic diagram of an LED lighting system according to an example of the present disclosure.

Based on the same inventive concept, the present disclosure further provides an LED lighting system. FIG. 8 illustrates a structural schematic diagram of an LED lighting system according to an example of the present disclosure; and with reference to FIG. 8, the LED lighting system comprises: an inductive ballast 81, the above-described LED lamp tube 82 coupled with the inductive ballast 81, and a glow starter 83 coupled with the LED lamp tube 82. The LED lamp tube 82 comprises four analog filament impedance circuits (i.e., a first analog filament impedance circuit 821, a second analog filament impedance circuit 822, a third analog filament impedance circuit 823 and a fourth analog filament impedance circuit 824) illustrated in either example disclosed above, an LED driving module 825 and at least one light emitting element 826.

The LED lamp tube 82 is provided with four terminals (i.e., a terminal 1, a terminal 2, a terminal 3 and a terminal 4), wherein, the terminal 1 and the terminal 2 are provided on one side of the LED lamp tube 82, and the terminal 3 and the terminal 4 are provided on the other side of the LED lamp tube 82. A live wire input to the mains electricity supply is connected with one end of the inductive ballast 81, and the other end of the inductive ballast 81 is connected with the first analog filament impedance circuit 821 of the LED lamp tube 82 through the terminal 1, a neutral wire in connection with the mains electricity supply is connected with the third analog filament impedance circuit 823 of the LED lamp tube 82 through the terminal 3, the glow starter 83 is respectively connected with the second analog filament impedance circuit 822 and the fourth analog filament impedance circuit 824 of the LED lamp tube 82 through the terminal 2 and the terminal 4. A voltage and a current input to the LED lamp tube 82 flow through the first analog filament impedance circuit 821 to the LED driving module 825, then to the at least one light emitting element 826, and finally flow back through the third analog filament impedance circuit 823.

Figure 9:
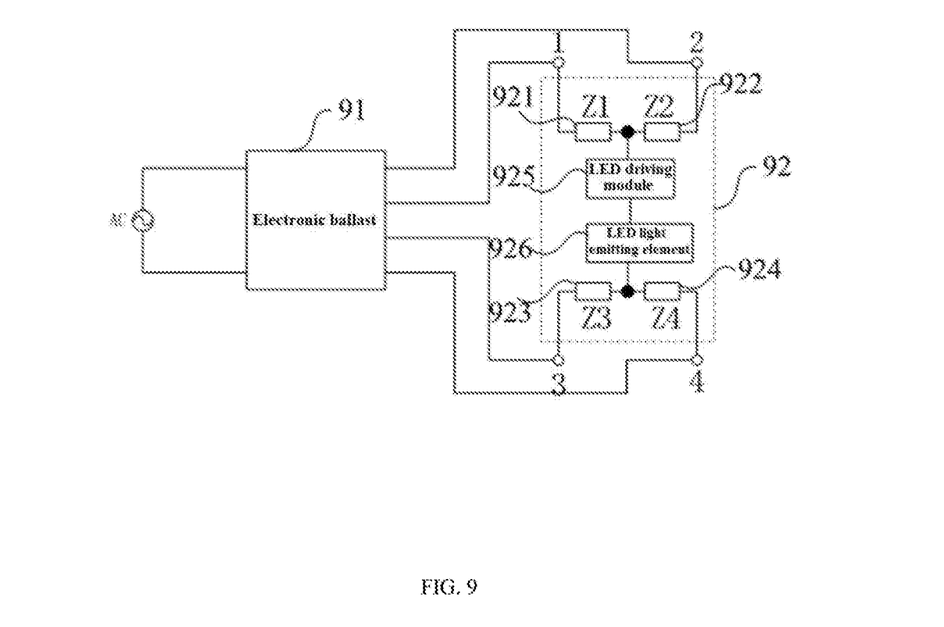
FIG. 9 illustrates another structural schematic diagram of an LED lighting system according to an example of the present disclosure.

FIG. 9 illustrates another structural schematic diagram of an LED lighting system according to an example of the present disclosure. With reference to FIG. 9, the LED lighting system comprises: an electronic ballast 91, and the above-described LED lamp tube 92 coupled with the electronic ballast 91. The LED lamp tube 92 comprises four analog filament impedance circuits (i.e., a first analog filament impedance circuit 921, a second analog filament impedance circuit 922, a third analog filament impedance circuit 923 and a fourth analog filament impedance circuit 924) illustrated in either example disclosed above, an LED driving module 925 and at least one light emitting element 926.

The LED lamp tube 92 is provided with four terminals (i.e., a terminal 1, a terminal 2, a terminal 3 and a terminal 4), wherein, the terminal 1 and the terminal 2 are provided on one side of the LED lamp tube 92, and the terminal 3 and the terminal 4 are provided on the other side of the LED lamp tube 92. An input of the mains electricity supply is directly connected with the electronic ballast 91, and the electronic ballast 91 is respectively connected with the first analog filament impedance circuit 921, the second analog filament impedance circuit 922, the third analog filament impedance circuit 923 and the fourth analog filament impedance circuit 924 of the LED lamp tube 92 through the terminal 1, the terminal 2, the terminal 3 and the terminal 4. A voltage and a current input to the LED lamp tube 92 flow through the first analog filament impedance circuit 921 to the LED driving module 925, then to the at least one light emitting element 926, and finally flow back through the third analog filament impedance circuit 923.

In summary, the analog filament impedance circuit, the LED lamp tube and the LED lighting system provided by the examples of the present disclosure may achieve advantageous effects below.

The analog filament impedance circuit provided by the present disclosure has the pole frequency and the zero frequency at the same time, and the pole frequency is less than the zero frequency. The equivalent impedance value of the analog filament impedance circuit exhibits a corresponding change trend with the input frequency, that is, the first equivalent impedance value of the analog filament impedance circuit, when the input frequency is less than the pole frequency, is greater than the second equivalent impedance value of the analog filament impedance circuit, when the input frequency is greater than the zero frequency; and the equivalent impedance value of the analog filament impedance circuit decreases as the input frequency increases when the input frequency is greater than the pole frequency and less than the zero frequency.

Thus, it is concluded that: the equivalent impedance value of the analog filament impedance circuit is relatively high when the input frequency is less than the pole frequency; and the equivalent impedance value of the analog filament impedance circuit is relatively low when the input frequency is greater than the zero frequency. When the analog filament impedance circuit undergoes the IEC standard test, since the frequency of the test is relatively low, which is generally 50/60 Hz, the frequency of the IEC standard test is less than the pole frequency of the analog filament impedance circuit, and the equivalent impedance value of the analog filament impedance circuit is relatively large when the input frequency is the frequency of the IEC standard test, so that the equivalent impedance value of the analog filament impedance circuit may meet the requirement of the IEC standard test on the minimal value. If the external ballast of the analog filament impedance circuit provided by the present disclosure is the inductive ballast, a voltage and a current input from the inductive ballast to the analog filament impedance circuit are a low frequency voltage and a low frequency current, in a high-voltage small-current state, at which time, relatively large equivalent impedance value of the analog filament impedance circuit does not have much influence on the transformation efficiency of the LED lamp tube.

If the external ballast of the analog filament impedance circuit provided by the present disclosure is the electronic ballast, the output frequency of the electronic ballast is relatively high, the output frequency is greater than the pole frequency of the analog filament impedance circuit, and even greater than the zero frequency of the analog filament impedance circuit. Since the equivalent impedance value of the analog filament impedance circuit decreases as the input frequency increases when the input frequency is greater than the pole frequency, the analog filament impedance circuit has a relatively small equivalent impedance value at this time, and the electronic ballast inputs a low voltage and a large current to the analog filament impedance circuit. At this time, the relatively small equivalent impedance value of the analog filament impedance circuit may significantly reduce its own power consumption, so as to further reduce influence on the transformation efficiency of the lamp tube.

The present disclosure provides an analog filament impedance circuit, an LED lamp tube and an LED lighting system.

Based on one aspect of the disclosure, an analog filament impedance circuit is provided, which has a pole frequency and a zero frequency, wherein, the pole frequency is less than the zero frequency; an equivalent impedance value of the analog filament impedance circuit remains unchanged when an input frequency is less than the pole frequency, and is a first equivalent impedance value; an equivalent impedance value of the analog filament impedance circuit decreases as the input frequency increases when the input frequency is greater than the pole frequency and less than the zero frequency; an equivalent impedance value of the analog filament impedance circuit remains unchanged when the input frequency is greater than the zero frequency, and is a second equivalent impedance value; and the first equivalent impedance value is greater than the second equivalent impedance value.

Optionally, the circuit includes a first resistor, a second resistor and a first capacitor.

Optionally, the first resistor and the first capacitor are connected in parallel, and then connected in series with the second resistor.

Optionally, the first resistor and the first capacitor are connected in series, and then connected in parallel with the second resistor.

Based on another aspect of the disclosure, an LED lamp tube is provided, which comprises: at least one analog filament impedance circuit according to any items as mentioned above, an LED driving module and at least one LED light emitting element, wherein, the LED driving module is coupled with the analog filament impedance circuit, and the at least one light emitting element is coupled with the LED driving module.

Optionally, the LED lamp tube comprises four analog filament impedance circuits, which are a first analog filament impedance circuit, a second analog filament impedance circuit, a third analog filament impedance circuit and a fourth analog filament impedance circuit, the first analog filament impedance circuit and the second analog filament impedance circuit being connected in series, and the third analog filament impedance circuit and the fourth analog filament impedance circuit being connected in series.

Based on another aspect of the disclosure, an LED lighting system is provided, which comprises: an inductive ballast, the LED lamp tube as mentioned above coupled with the inductive ballast, and a glow starter coupled with the LED lamp tube.

Optionally, the LED lamp tube includes four analog filament impedance circuits, which are a first analog filament impedance circuit, a second analog filament impedance circuit, a third analog filament impedance circuit and a fourth analog filament impedance circuit, the first analog filament impedance circuit and the second analog filament impedance circuit being connected in series, and the third analog filament impedance circuit and the fourth analog filament impedance circuit being connected in series.

Optionally, one end of the LED driving module is connected with one end of the first analog filament impedance circuit and one end of the second analog filament impedance circuit, the other end of the LED driving module is connected with the at least one LED light emitting element, and the other end of the at least one LED light emitting element is connected with one end of the third analog filament impedance circuit and one end of the fourth analog filament impedance circuit; one end of the first analog filament impedance circuit not connected with the LED driving module is connected with the inductive ballast, one end of the second analog filament impedance circuit not connected with the LED driving module is connected with one end of the external glow starter of the LED lamp tube, one end of the third analog filament impedance circuit not connected with the at least one LED light emitting element is connected with a neutral wire in connection with a mains electricity supply, and one end the fourth analog filament impedance circuit not connected with the at least one LED light emitting element is connected with the other end of the glow starter.

Based on another aspect of the disclosure, an LED lighting system is provided, which comprises: an electronic ballast and the LED lamp tube as mentioned above coupled with the electronic ballast.

Optionally, the LED lamp tube comprises four analog filament impedance circuits, which are a first analog filament impedance circuit, a second analog filament impedance circuit, a third analog filament impedance circuit and a fourth analog filament impedance circuit, the first analog filament impedance circuit and the second analog filament impedance circuit being connected in series, and the third analog filament impedance circuit and the fourth analog filament impedance circuit being connected in series.

Optionally, one end of the LED driving module is connected with one end of the first analog filament impedance circuit and one end of the second analog filament impedance circuit, the other end of the LED driving module is connected with the at least one LED light emitting element, and the other end of the at least one LED light emitting element is connected with one end of the third analog filament impedance circuit and one end of the fourth analog filament impedance circuit; one end of the first analog filament impedance circuit not connected with the LED driving module is connected with the external electronic ballast of the LED lamp tube, one end of the second analog filament impedance circuit not connected with the LED driving module is connected with the external electronic ballast of the LED lamp tube, one end of the third analog filament impedance circuit not connected with the at least one LED light emitting element is connected with the electronic ballast, and one end the fourth analog filament impedance circuit not connected with the at least one LED light emitting element is connected with the electronic ballast.

The analog filament impedance circuit provided by the present disclosure has the pole frequency and the zero frequency at a same time, and the pole frequency is less than the zero frequency. The equivalent impedance value of the analog filament impedance circuit exhibits a corresponding change trend along with the input frequency, that is, the first equivalent impedance value of the analog filament impedance circuit, when the input frequency is less than the pole frequency, is greater than the second equivalent impedance value of the analog filament impedance circuit, when the input frequency is greater than the zero frequency; and the equivalent impedance value of the analog filament impedance circuit decreases as the input frequency increases, when the input frequency is greater than the pole frequency and less than the zero frequency.

Thus, it is concluded that: the equivalent impedance value of the analog filament impedance circuit is relatively high when the input frequency is less than the pole frequency; and the equivalent impedance value of the analog filament impedance circuit is relatively low when the input frequency is greater than the zero frequency. When the analog filament impedance circuit undergoes the IEC standard test, since the frequency of the test is relatively low, which is generally 50/60 Hz, the frequency of the IEC standard test is less than the pole frequency of the analog filament impedance circuit, and the equivalent impedance value of the analog filament impedance circuit is relatively large when the input frequency is the frequency of the IEC standard test, so that the equivalent impedance value of the analog filament impedance circuit may meet a requirement of the IEC standard test on a minimal value. If the external ballast of the analog filament impedance circuit provided by the present disclosure is an inductive ballast, a voltage and a current input from the inductive ballast to the analog filament impedance circuit are a low frequency voltage and a low frequency current, in a high-voltage small-current state, at which time, relatively large equivalent impedance value of the analog filament impedance circuit does not have much influence on transformation efficiency of the LED lamp tube.

If the external ballast of the analog filament impedance circuit provided by the present disclosure is an electronic ballast, an output frequency of the electronic ballast is relatively high, and the output frequency is greater than the pole frequency of the analog filament impedance circuit, and even greater than the zero frequency of the analog filament impedance circuit. Since the equivalent impedance value of the analog filament impedance circuit decreases as the input frequency increases when the input frequency is greater than the pole frequency, the analog filament impedance circuit has a relatively small equivalent impedance value at this time, and the electronic ballast inputs a low voltage and a large current to the analog filament impedance circuit. At this time, the relatively small equivalent impedance value of the analog filament impedance circuit may significantly reduce its own power consumption, so as to further reduce influence on the transformation efficiency of the lamp tube.

The present disclosure also provides a method of utilizing an analog filament impedance circuit. The method may include: obtaining a pole frequency that is less than a zero frequency; keeping an equivalent impedance value of the analog filament impedance circuit remains unchanged when an input frequency is less than the pole frequency, and is a first equivalent impedance value; decreasing an equivalent impedance value of the analog filament impedance circuit as the input frequency increases when the input frequency is greater than the pole frequency and less than the zero frequency; keeping an equivalent impedance value of the analog filament impedance circuit remains unchanged when the input frequency is greater than the zero frequency, and is a second equivalent impedance value; and obtaining the first equivalent impedance value that is greater than the second equivalent impedance value.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

In the specification provided herein, numerous specific details are explained. However, it may be understood that the examples of the present disclosure may be practiced without these specific details. In some examples, well-known methods, structures and technologies are not shown in detail so as not to obscure the understanding of the present specification.

Similarly, it should be understood that, in order to streamline the present disclosure and help to understand one or more of the respective disclosure aspects, in the above description of the examples of the present disclosure, the respective features of the present disclosure are sometimes grouped together into a single example, diagram, or description thereof. However, the disclosed method should not be interpreted as reflecting an intention below: more features than those explicitly recorded in each claim are required in the present disclosure for which protection is claimed. More specifically, as reflected in the following claims, the inventive aspects are fewer than all the features of the previously disclosed single example. Therefore, the claims that follow the specific implementation modes are explicitly incorporated into the specific implementation modes, wherein, each claim itself is taken as a separate example of the present disclosure.

So far, it should be recognized by those skilled in the art that, although a plurality of examples of the present disclosure have been shown and described in detail herein, many other transformations or modifications that conform to the principles of the present disclosure may still be directly determined or derived from the contents disclosed by the present disclosure without departing from the spirit and scope of the present disclosure. Therefore, the scope of the present disclosure should be understood and confirmed as covering all the other transformations or modifications.

The invention claimed is:

1. An analog circuit comparing an analog filament impedance circuit comprising a first resistor, a second resistor and a first capacitor, wherein:

a pole frequency of the analog filament impedance circuit is determined based on a first resistance value of the first resistor and a capacitance value of the first capacitor;

a zero frequency of the analog filament impedance circuit is determined based on a second resistance value of the second resistor, the first resistance value of the first resistor, and the capacitance value of the first capacitor;

the pole frequency is less than the zero frequency;

an equivalent impedance value of the analog filament impedance circuit is determined based on the first resistance value of the first resistor, the second resistance value of the second resistor, the capacitance value of the first capacitor, and an input frequency;

the equivalent impedance value of the analog filament impedance circuit remains unchanged and equals to a first equivalent impedance value, when the input frequency is less than the pole frequency;

the equivalent impedance value of the analog filament impedance circuit decreases as the input frequency increases, when the input frequency is greater than the pole frequency and less than the zero frequency;

the equivalent impedance value of the analog filament impedance circuit remains unchanged and equals to a second equivalent impedance value, when the input frequency is greater than the zero frequency;

the first equivalent impedance value is greater than the second equivalent impedance value; and the analog circuit comprises four analog filament impedance circuits which comprise a first analog filament impedance circuit, a second analog filament impedance circuit, a third analog filament impedance circuit and a fourth analog filament impedance circuit, and wherein the first analog filament impedance circuit and the second analog filament impedance circuit are connected in series, and the third analog filament impedance circuit and the fourth analog filament impedance circuit being connected in series; and one end of the first analog filament impedance circuit is connected with one end of an LED driving module, another end of the LED driving module is connected with one end of at least one LED light emitting element, and another end of the at least one LED light emitting element is connected with one end of the third analog filament impedance circuit.

2. The analog filament impedance circuit according to claim 1, wherein the first resistor and the first capacitor are connected in parallel, and then connected in series with the second resistor.

3. The analog filament impedance circuit according to claim 1, wherein the first resistor and the first capacitor are connected in series, and then connected in parallel with the second resistor.

4. An LED lamp tube, comprising:

at least one analog filament impedance circuit wherein the at least one analog filament impedance circuit comprises a first resistor, a second resistor and a first capacitor, and wherein:

a pole frequency of the analog filament impedance circuit is determined based on a first resistance value of the first resistor and a capacitance value of the first capacitor;

a zero frequency of the analog filament impedance circuit is determined based on a second resistance value of the second resistor, the first resistance value of the first resistor, and the capacitance value of the first capacitor;

the pole frequency is less than the zero frequency;

an equivalent impedance value of the analog filament impedance circuit is determined based on the first resistance value of the first resistor, the second resistance value of the second resistor, the capacitance value of the first capacitor, and an input frequency;

the equivalent impedance value of the analog filament impedance circuit remains unchanged and equals to a first equivalent impedance value, when the input frequency is less than the pole frequency;

the equivalent impedance value of the analog filament impedance circuit decreases as the input frequency increases when the input frequency is greater than the pole frequency and less than the zero frequency;

the equivalent impedance value of the analog filament impedance circuit remains unchanged and equals to a second equivalent impedance value, when the input frequency is greater than the zero frequency;

the first equivalent impedance value is greater than the second equivalent impedance value;

the LED lamp tube and an electronic ballast are comprised in an LED light system; and the LED lamp tube comprises four analog filament impedance circuits which comprise a first analog filament impedance circuit, a second analog filament impedance circuit, a third analog filament impedance circuit and a fourth analog filament impedance circuit, and wherein the first analog filament impedance circuit and the second analog filament impedance circuit are connected in series, and the third analog filament impedance circuit and the fourth analog filament impedance circuit being connected in series; and one end of the first analog filament impedance circuit is connected with one end of an LED driving module, another end of the LED driving module is connected with one end of at least one LED light emitting element, and another end of the at least one LED light emitting element is connected with one end of the third analog filament impedance circuit.

5. The LED lamp tube according to claim 4, wherein the LED lamp tube comprises four analog filament impedance circuits which comprise the first analog filament impedance circuit, the second analog filament impedance circuit, a third analog filament impedance circuit and a fourth analog filament impedance circuit, and wherein the first analog filament impedance circuit and the second analog filament impedance circuit being connected in series, and the third analog filament impedance circuit and the fourth analog filament impedance circuit being connected in series.

6. An LED lighting system, comprising: an inductive ballast, the LED lamp tube according to claim 4 coupled with the inductive ballast, and a glow starter coupled with the LED lamp tube.

7. The LED lighting system according to claim 6, wherein the LED lamp tube includes four analog filament impedance circuits which comprise a first analog filament impedance circuit, a second analog filament impedance circuit, a third analog filament impedance circuit and a fourth analog filament impedance circuit, and wherein the first analog filament impedance circuit and the second analog filament impedance circuit being connected in series, and the third analog filament impedance circuit and the fourth analog filament impedance circuit being connected in series.

8. The LED lighting system according to claim 7, wherein:

one end of the LED driving module is connected with one end of the first analog filament impedance circuit and one end of the second analog filament impedance circuit, another end of the LED driving module is connected with the at least one LED light emitting element, and another end of the at least one LED light emitting element is connected with one end of the third analog filament impedance circuit and one end of the fourth analog filament impedance circuit; and one end of the first analog filament impedance circuit not connected with the LED driving module is connected with the inductive ballast, one end of the second analog filament impedance circuit not connected with the LED driving module is connected with one end of the glow starter of the LED lamp tube, one end of the third analog filament impedance circuit not connected with the at least one LED light emitting element is connected with a neutral wire in connection with a mains electricity supply, and one end the fourth analog filament impedance circuit not connected with the at least one LED light emitting element is connected with the other end of the glow starter.

9. The LED lighting system according to claim 4, wherein:

one end of the LED driving module is connected with one end of the first analog filament impedance circuit and one end of the second analog filament impedance circuit, another end of the LED driving module is connected with the at least one LED light emitting element, and another end of the at least one LED light emitting element is connected with one end of the third analog filament impedance circuit and one end of the fourth analog filament impedance circuit; and one end of the first analog filament impedance circuit not connected with the LED driving module is connected with the electronic ballast of the LED lamp tube, one end of the second analog filament impedance circuit not connected with the LED driving module is connected with the electronic ballast of the LED lamp tube, one end of the third analog filament impedance circuit not connected with the at least one LED light emitting element is connected with the electronic ballast, and one end the fourth analog filament impedance circuit not connected with the at least one LED light emitting element is connected with the electronic ballast.

* * * * *